US012570178B2

(12) United States Patent
     Gottlieb et al.

(10) Patent No.: US 12,570,178 B2
(45) Date of Patent: Mar. 10, 2026

(54) SYSTEM AND METHOD FOR SEQUENTIAL POWER CHARGING SWITCHING FOR ELECTRIC VEHICLE(S)

(71) Applicant: Rhombus Energy Solutions, Inc., San Diego, CA (US)

(72) Inventors: Joseph Gottlieb, Poway, CA (US); Kevin Stone, San Diego, CA (US)

(73) Assignee: Rhombus Energy Solutions, Inc., San Diego, CA (US)

( * ) Notice: Subject to any disclaimer, the term of this patent is extended or adjusted under 35 U.S.C. 154(b) by 931 days.

(21) Appl. No.: 17/808,513

(22) Filed: Jun. 23, 2022

(65) Prior Publication Data

US 2022/0410757 A1     Dec. 29, 2022

Related U.S. Application Data

(60) Provisional application No. 63/214,235, filed on Jun. 23, 2021.

(51) Int. Cl.
     *B60L 53/67*        (2019.01)
     *B60L 53/10*        (2019.01)
     *B60L 53/30*        (2019.01)
     *B60L 53/31*        (2019.01)
     *B60L 53/63*        (2019.01)
     *B60L 53/68*        (2019.01)
(52) U.S. Cl.
     CPC ............... *B60L 53/67* (2019.02); *B60L 53/11* (2019.02); *B60L 53/305* (2019.02); *B60L 53/31* (2019.02); *B60L 53/63* (2019.02); *B60L 53/68* (2019.02)

(58) Field of Classification Search
     CPC ....................................................... B60L 53/67
     USPC ........................................................ 320/109
     See application file for complete search history.

(56) References Cited

U.S. PATENT DOCUMENTS

| | | | | |
|---|---|---|---|---|
| 8,731,730 | B2 * | 5/2014 | Watkins ................. | B60L 53/14 320/109 |
| 9,779,365 | B2 * | 10/2017 | Smullin ................. | G06Q 10/02 |
| 10,843,581 | B2 * | 11/2020 | Reynolds ............... | B60L 53/62 |

(Continued)

OTHER PUBLICATIONS

Proterra Launches Multi-Dispenser Charging Solution for Heavy-Duty Electric Vehicle Fleets, Press Release, Oct. 14, 2019, https://www.proterra.com/press-release/proterra-launches-multi-dispenser-charging-solution-for-heavy-duty-electric-vehicle-fleets, p. 4.

*Primary Examiner* — Jerry D Robbins
(74) *Attorney, Agent, or Firm* — Dickinson Wright PLLC

(57)            ABSTRACT

A multi-charger, serially operated electrical vehicle (EV) charging system, contains a Power Control System (PCS) providing DC power. A plurality of EV chargers is serially power-connected to each other, wherein the first EV charger is connected to the PCS. There are sets of relays in at least the first EV charger, wherein a first set of the set of relays, when activated, is configured to supply power to a respective charging cable of the EV charger, and a second set of the set of relays, when activated, is configured to supply power to a next-serially connected EV charger. The sets of relays contain auxiliary contacts providing relay status information. A hardware logic prevents the first and second sets of relays from simultaneously being activated, allowing only one EV charger of the plurality of EV chargers to charge at a time.

20 Claims, 11 Drawing Sheets

200

(56)                    References Cited

U.S. PATENT DOCUMENTS

| | | | |
|---|---|---|---|
| 2001/0010456 A1* | 8/2001 | Kaite | H02J 7/0019 |
| | | | 320/125 |
| 2011/0140659 A1* | 6/2011 | Suzuki | B60L 53/67 |
| | | | 320/109 |
| 2011/0291616 A1* | 12/2011 | Kim | H02J 5/00 |
| | | | 320/109 |
| 2012/0044843 A1* | 2/2012 | Levy | H02J 13/00002 |
| | | | 370/310 |
| 2012/0056582 A1* | 3/2012 | Iwata | B60L 53/305 |
| | | | 320/109 |
| 2012/0181990 A1* | 7/2012 | Asakura | H02J 5/00 |
| | | | 320/137 |
| 2014/0089016 A1* | 3/2014 | Smullin | G06Q 10/02 |
| | | | 705/5 |
| 2016/0193932 A1* | 7/2016 | Vaghefinazari | H02J 7/0029 |
| | | | 320/109 |
| 2018/0111493 A1* | 4/2018 | Chan | G01R 19/10 |
| 2019/0070970 A1* | 3/2019 | Chan | B60L 53/65 |
| 2022/0242269 A1* | 8/2022 | Koolen | H02J 7/0013 |

* cited by examiner

PRIOR ART

<u>100</u>

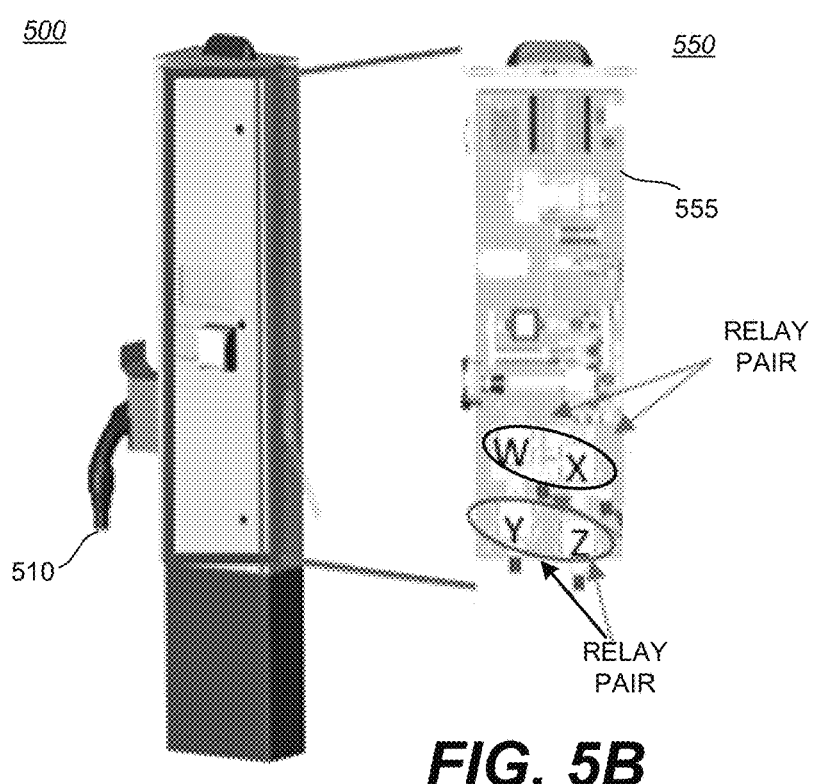
*FIG. 5B*
*FIG. 5A*
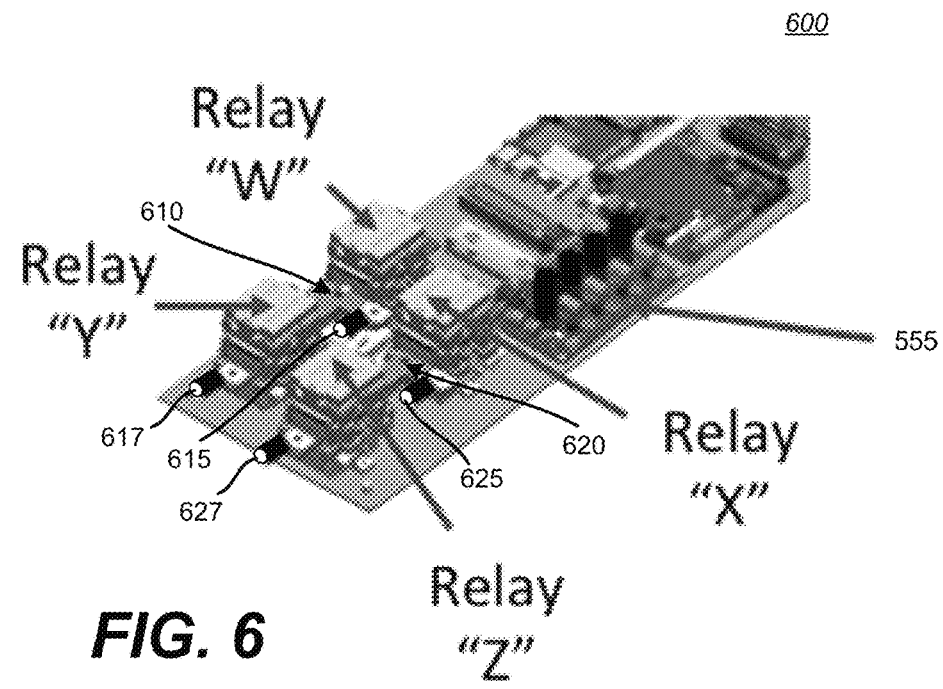
*FIG. 6*

_700_

| Version | Monostable * | Bistable ** |
|---|---|---|
| V0 - w/o aux contact | A1+    1 <br><br> A2 -    2 | A1 +/- 1    12 14 <br> ⌐L¬ <br> A2+/- 2    11 |
| V1 - 1 aux contact <br><br> Snap-action switch <br> S880 W1R6a | A1+    1    12 14 <br> ⌐L¬ <br> A2 -    2    11 | A1 +/- 1    12 14 <br> ⌐L¬ <br> A2+/- 2    11 |

\* Coil suppression integrated, additional circuit is not allowed!
\*\* Switching by reversing the polarity, voltage pulse 1 sec max.

FIG. 7

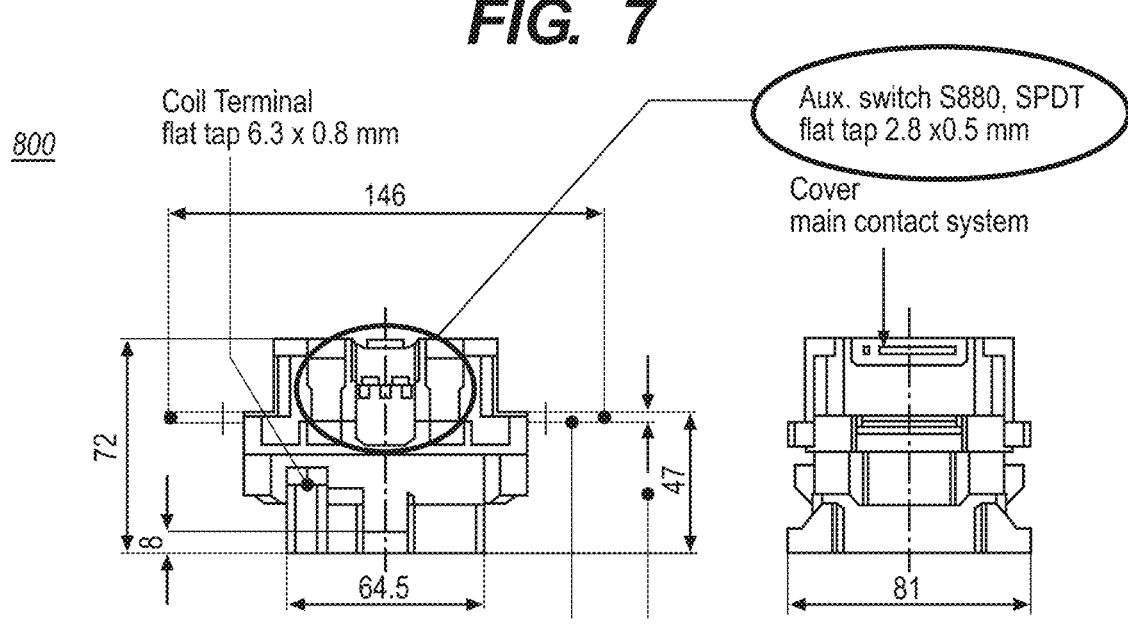

_800_

Coil Terminal
flat tap 6.3 x 0.8 mm

Aux. switch S880, SPDT
flat tap 2.8 x0.5 mm

Cover
main contact system

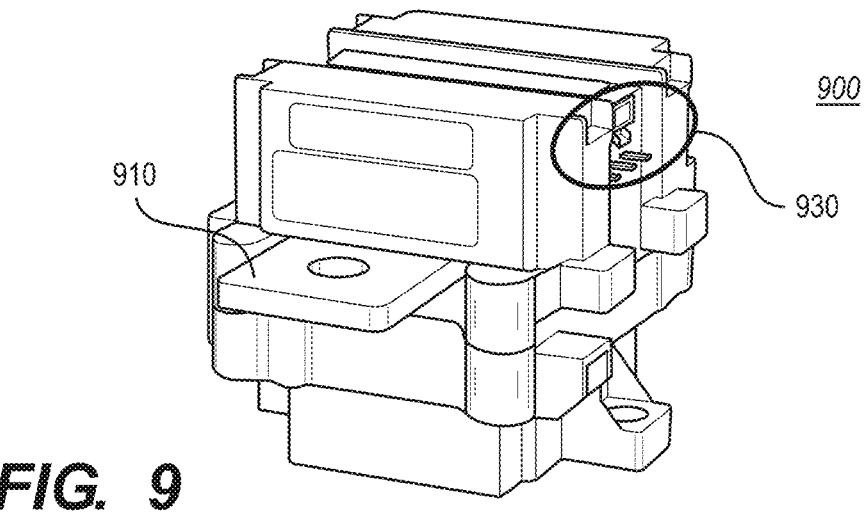

| COIL ENABLE | SELECT XY | W | X | Y | Z |
|---|---|---|---|---|---|
| 0 | 0 | 0 | 0 | 0 | 0 |
| 0 | 1 | 0 | 0 | 0 | 0 |
| 1 | 0 | 0 | 0 | 1 | 1 |
| 1 | 1 | 1 | 1 | 0 | 0 |

_1100_

1300

1400

SYSTEM AND METHOD FOR SEQUENTIAL POWER CHARGING SWITCHING FOR ELECTRIC VEHICLE(S)

CROSS-REFERENCE TO RELATED APPLICATION(S)

This application claims the benefit of U.S. Provisional Patent Application No. 63/214,235, filed Jun. 23, 2021, titled "Sequential EV Power Switching," the contents of which are hereby incorporated by reference in its entirety.

FIELD

This invention is directed to power charging of electrical vehicles (EVs). More particularly to increasing charger utilization via sequential charging leading to reduced EV charging infrastructure costs.

BACKGROUND

A conventional EV charging station is comprised of multiple individual chargers with each charger connected to a distribution cabinet. If more chargers are needed to be added, another distribution cabinet and associated connections are required. Thus, significantly increasing the costs and hardware for the simple addition of a charger. Accordingly, there has been a long-standing need in the industry for adding EV chargers, without incurring the complication and costs of additional supporting hardware and connections.

In view of the above, various systems and methods are presented below to address one or more of the above difficulties in the prior art.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a multi-charger, serially operated electrical vehicle (EV) charging system is provided, comprising: a Power Control System (PCS) providing DC power to an output line; a plurality of EV chargers serially power-connected to each other; and a first EV charger of the plurality of EV chargers connected to the DC output line, sets of relays in at least the first EV charger, connected to the DC output line, wherein a first set of the set of relays, when activated, is configured to supply power to a respective charging cable of the EV charger, and a second set of the set of relays, when activated, is configured to supply power to a next-serially connected EV charger, wherein the sets of relays contain auxiliary contacts providing relay status information; and a controller, preventing the first and second sets of relays from simultaneously being activated, allowing only one EV charger of the plurality of EV chargers to charge at a time.

In another aspect of the disclosed embodiments, the above system is provided, further comprising an AC Power Inverter providing DC power to the PCS; and/or wherein the AC Power Inverter and PCS are an integrated, single system; and/or wherein a last of the serially connected plurality of EV chargers does not contain multiple sets of relays; and/or wherein an activated first set of relays is a Take condition, enabling a charging operation; and/or wherein an activated second set of relays is a Pass condition, enabling a pass of power operation; and/or further comprising an EV charger communication channel, between EV chargers; and/or wherein the communication channel communicates to at least one of the PCS and to an external server; and/or the communication channel is wireless; and/or wherein the controller is hardware circuitry within the EV chargers; and/or further comprising a switching logic controlling the EV chargers' sets of relays; and/or wherein the switching logic is software-based and hosted on an external server communicating with the PCS; and/or wherein the switching logic utilizes a Time-Based Round Robin (TBRR) approach; and/or wherein the switching logic further utilizes at least one of Set Point threshold, State of Charge threshold, Charged Time, User action, EV Fault, and number of EVs charging to determine an operation duration for an EV charger of the plurality of EV chargers; and/or wherein the first and second sets of relays are first and second pairs of relays, and one side of the pairs of relays is connected to a DC positive and another side of the pairs of relays is connected to a DC negative or ground.

In yet another aspect of the disclosed embodiments, a method of charging a plurality of EVs in a multi-EV charging station is provided, comprising: connecting a first EV charger of a plurality of EV chargers to a DC output line of a Power Control System (PCS); connecting a DC power line of each next EV charger of the plurality of EV chargers to each other to form a serial power connection between EV chargers, including the first EV charger; establishing a communication channel between each EV charger of the plurality of EV chargers and also to the PCS; and operating only one EV charger at a time, wherein each EV charger has at least one of a hardware logic and relay circuitry that physically prevents more than one EV charger activation at a time.

In yet another aspect of the disclosed embodiments, the above method is provided, wherein the operating is controlled via sets of relays having auxiliary contacts in the EV chargers, the auxiliary contacts providing a relay state status to at least one of the hardware logic and a controller, via the communication channel; and/or wherein the operating utilizes a Time-Based Round Robin (TBRR) approach; and/or the TBRR approach further utilizes at least one of Set Point threshold, State of Charge threshold, Charged Time, User action, EV Fault, and number of EVs charging to determine an EV charger operation duration; and/or wherein the TBRR approach is software based and controlled by an external server in communication to the PCS.

BRIEF DESCRIPTION OF THE DRAWINGS

FIG. 5A is an illustration of the exterior of an exemplary Dispenser.

FIG. 5B is an illustration of the principal modifications to the relay board in the exemplary Dispenser.

FIG. 6 is a closeup illustration of the exemplary relay board of FIG. 5.

FIG. 7 is an illustration of circuit diagrams of one set of commercially available power relays with and without auxiliary contacts.

FIG. 8 is an illustration of dimensional diagrams of one possible set of suitable relay(s) from SCHALTBAU.

FIG. 9 is photograph of a representative SCHALTBAU relay.

Figures 10A, 10B, 10C:
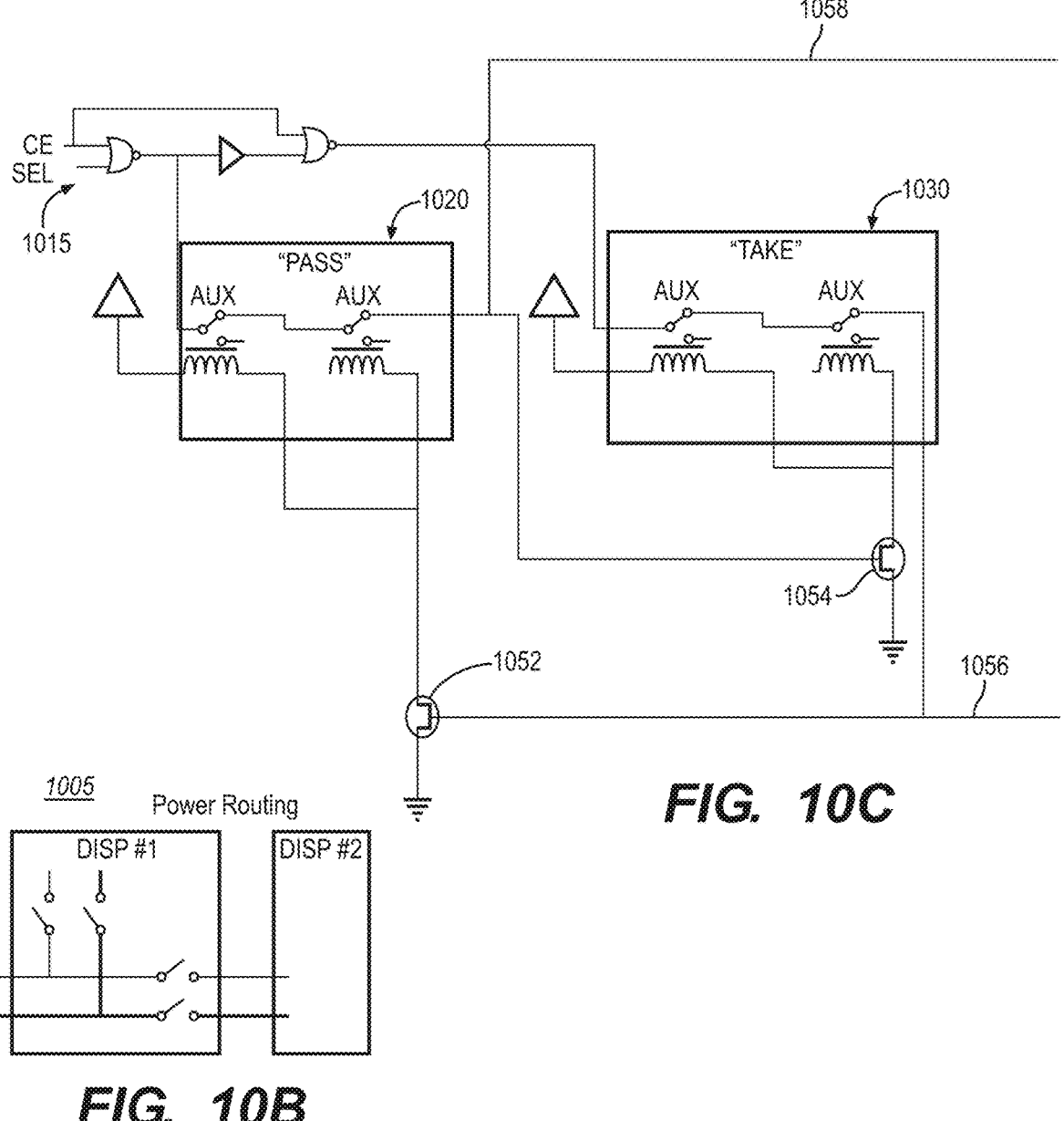

FIG. 10A is a logic table for operation of an exemplary dispenser.

FIG. 10B is a simple power routing diagram of the W, X, Y, Z relays for an exemplary dispenser.

FIG. 10C is high level schematic of one possible electrical connection methodology to achieve the operational logic for an exemplary dispenser operation.

Figure 11:
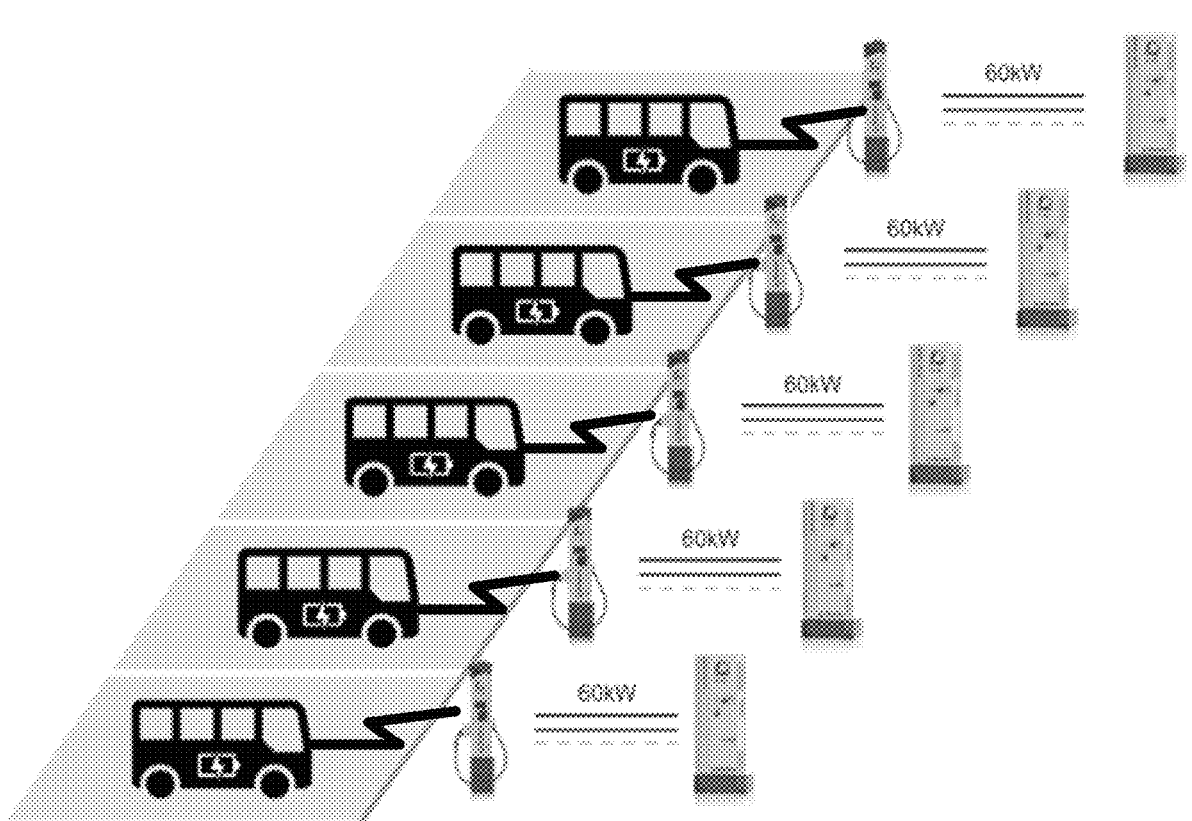

FIG. 11 is a depiction of a proposed single channel with simultaneous charging (1:1) configuration.

Figure 12:
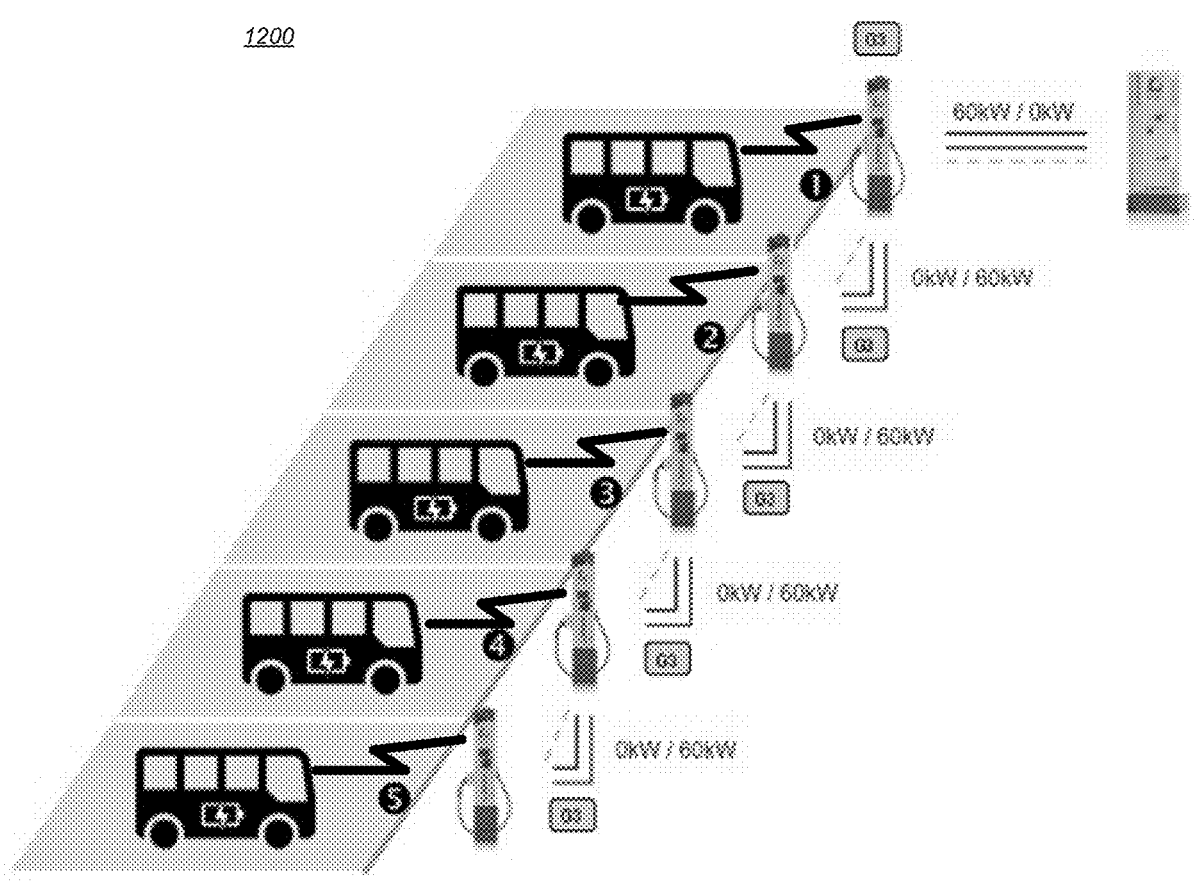

FIG. 12 is a depiction of a proposed single channel with sequential charging (5:1) configuration.

Figure 13:
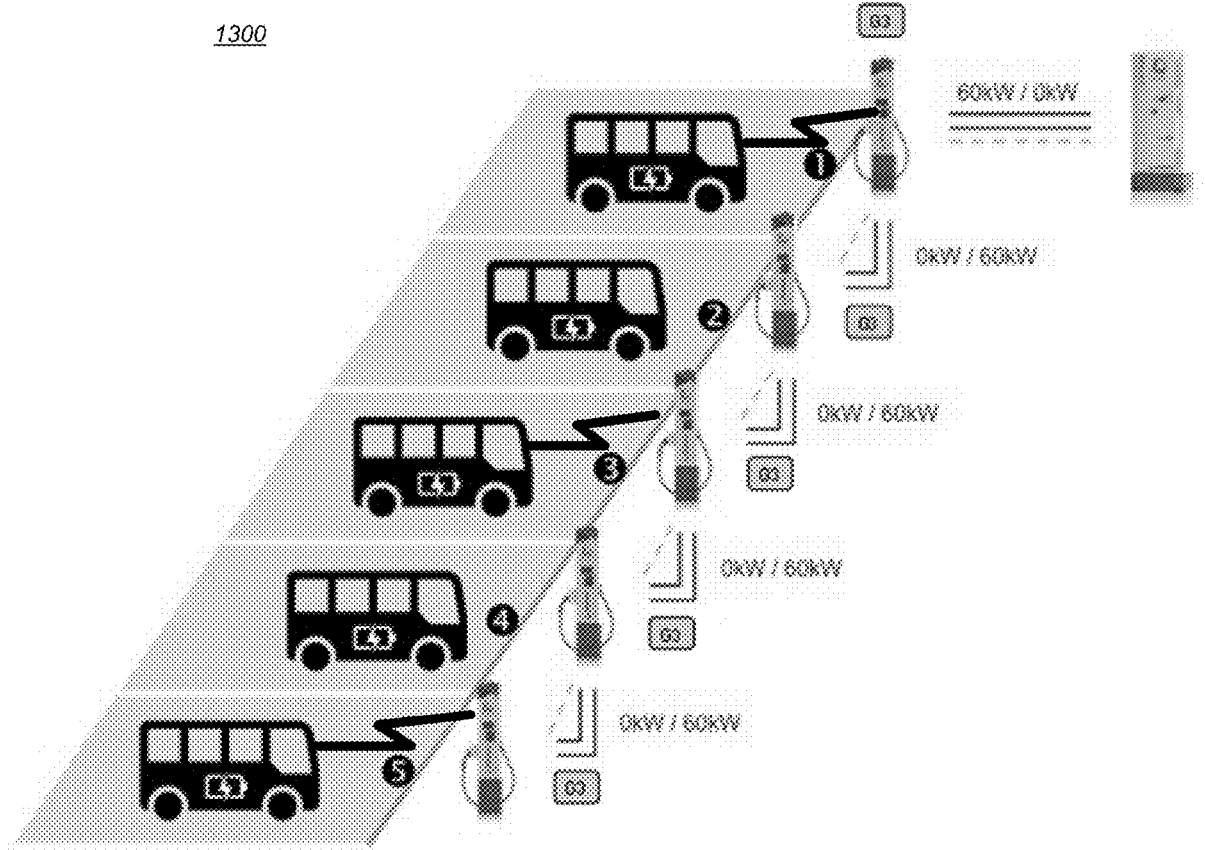

FIG. 13 is a depiction of a Case Study-Multiple Bus charging.

Figure 14:
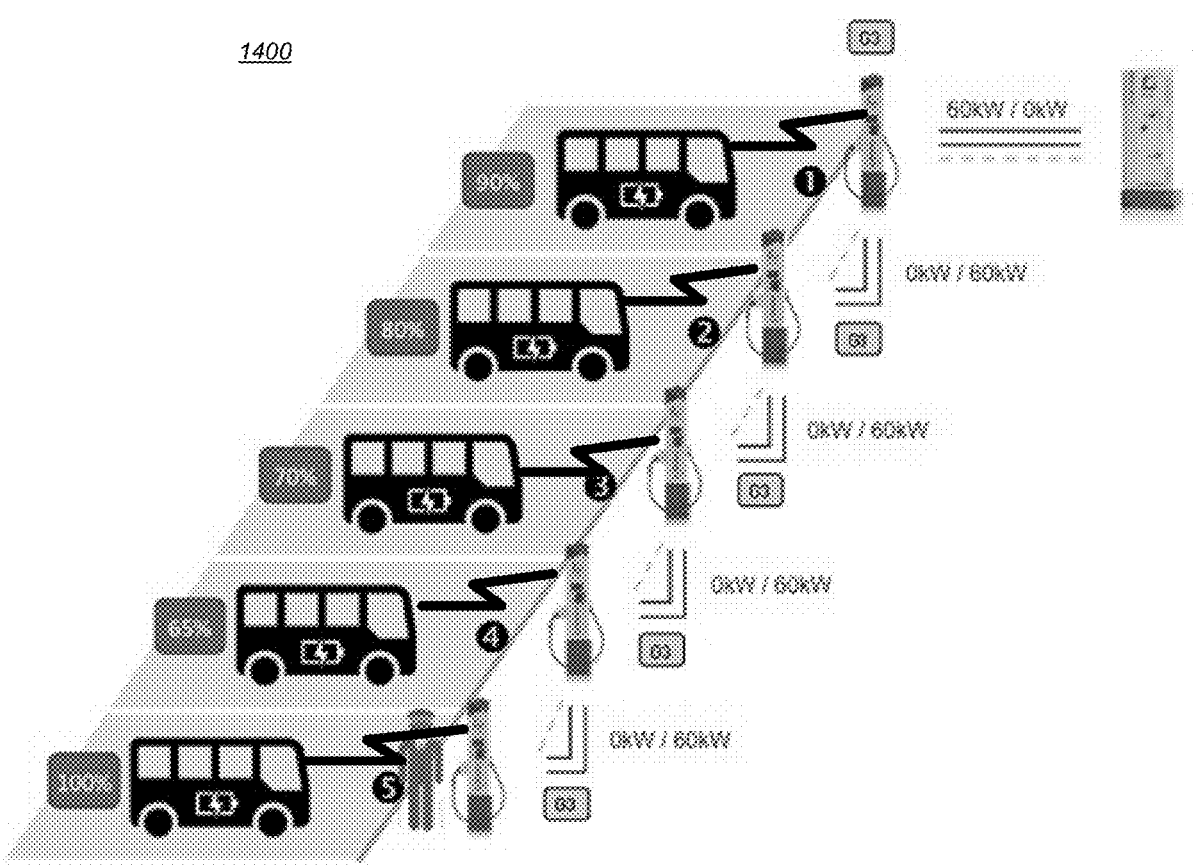

FIG. 14 is a depiction of Sequential Charging.

Figure 15:
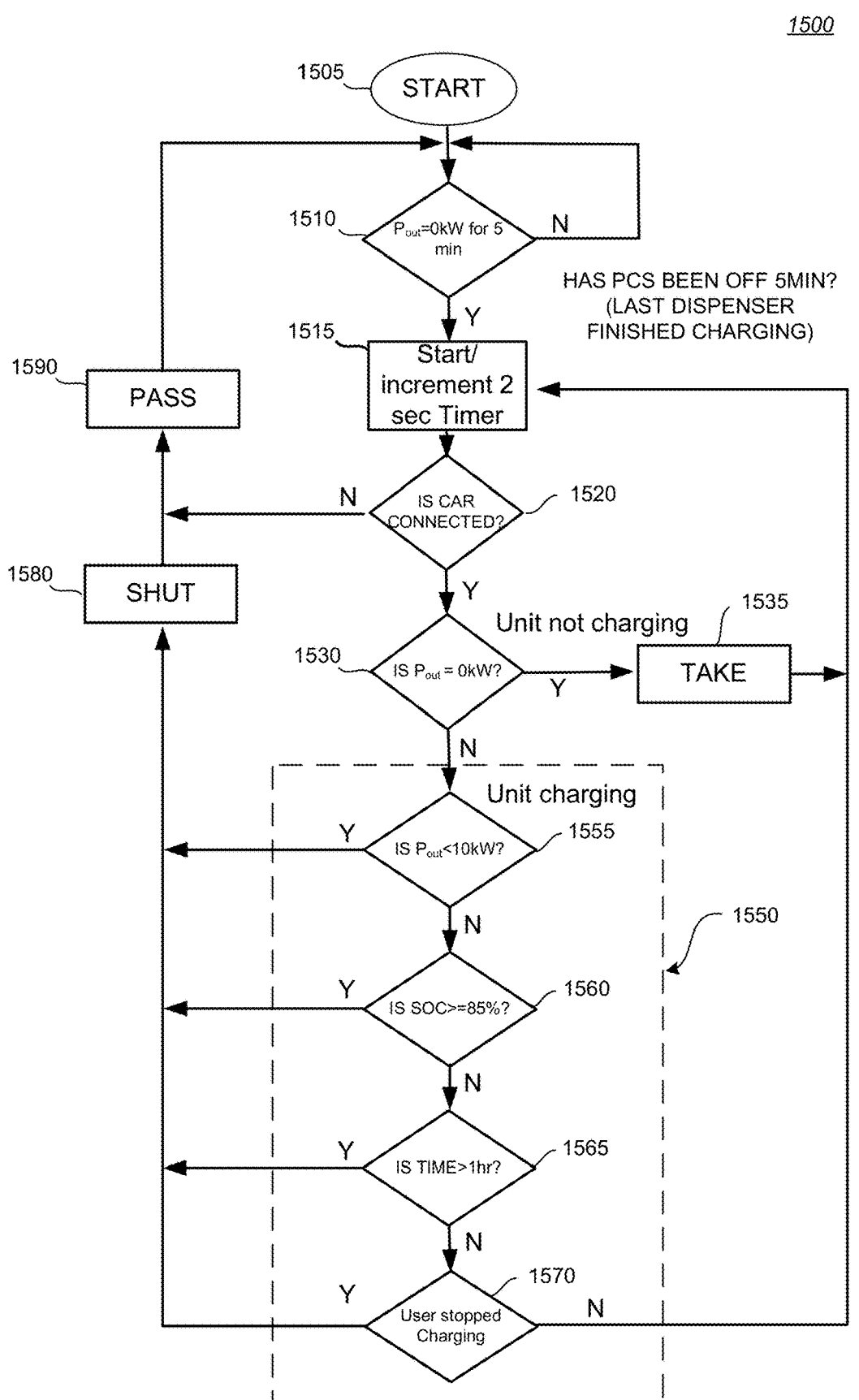

FIG. 15 is flow chart of one possible Sequential Switching Logic using Pass, Take, or Shut decisions.

DETAILED DESCRIPTION

The present disclosure describes exemplary systems and methods that increase charger utilization leading to reduced EV charging infrastructure costs. For example, one or more approaches are presented that increase utilization of a single high-power inverter/Power Control Systems (PCS) by allowing sequential connections. Further, the overall system design can be scalable, enabling the adding of power dispensers in a "series" configuration to a single PCS without the need or additional cost to redesign and re-certify a "centralized" or "hub" switching solution that has a fixed number of connections. The exemplary approach can add more units in the field without replacing or changing a central hub box, which can be costly. In some embodiments, the electrical design is of a "daisy chain" configuration vs. a "hub and spoke" configuration, wherein less cabling is necessary than in conventional approaches.

Because sequential (or time interleaving) charging is performed, for safety concerns, the exemplary approach can utilize power relay auxiliary contacts+supporting analog circuit(s) to prevent charging to more than one vehicle at a time. This analog circuit design approach removes reliance on software/controls to prevent unsafe sequential connection risks. These and other aspects of the exemplary systems and methods are presented in the following FIGS. descriptions.

Figure 1:
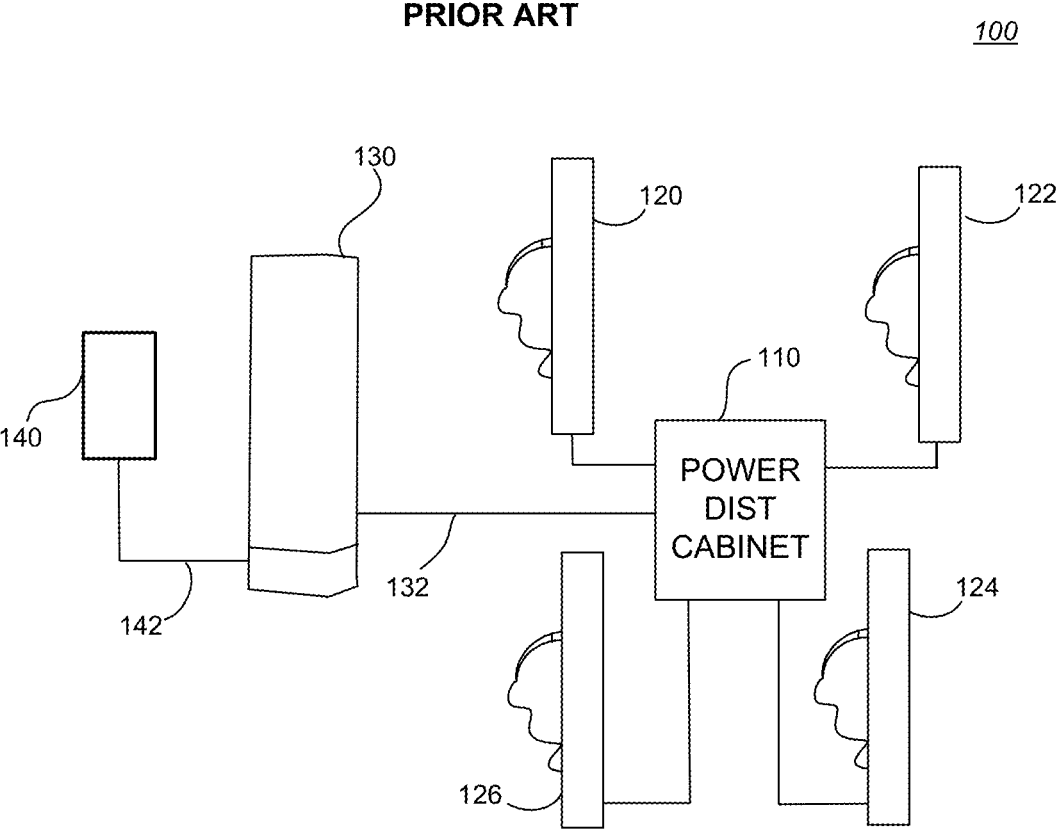
FIG. 1 illustrates a conventional prior-art system.

FIG. 1 illustrates a conventional prior-art system 100. A conventional system 100 typically uses a separate power distribution cabinet 110 that house sets of power relays pairs (1 positive & 1 negative—not shown) that connect to multiple dispensers 120, 122, 124, 126 in a "hub and spoke" arrangement. All the housed power relays are connected to the main power inverter 130 and a central controller (not shown) for managing which power relays can open or close. Connection to a power panel 140 is understood, wherein the power inverter 130 converts the AC current 142 to a DC current 132 for supply to the dispensers 120-126. These cabinets 110 can typically be connected to up to 4× dispensers at a time.

Figure 2:
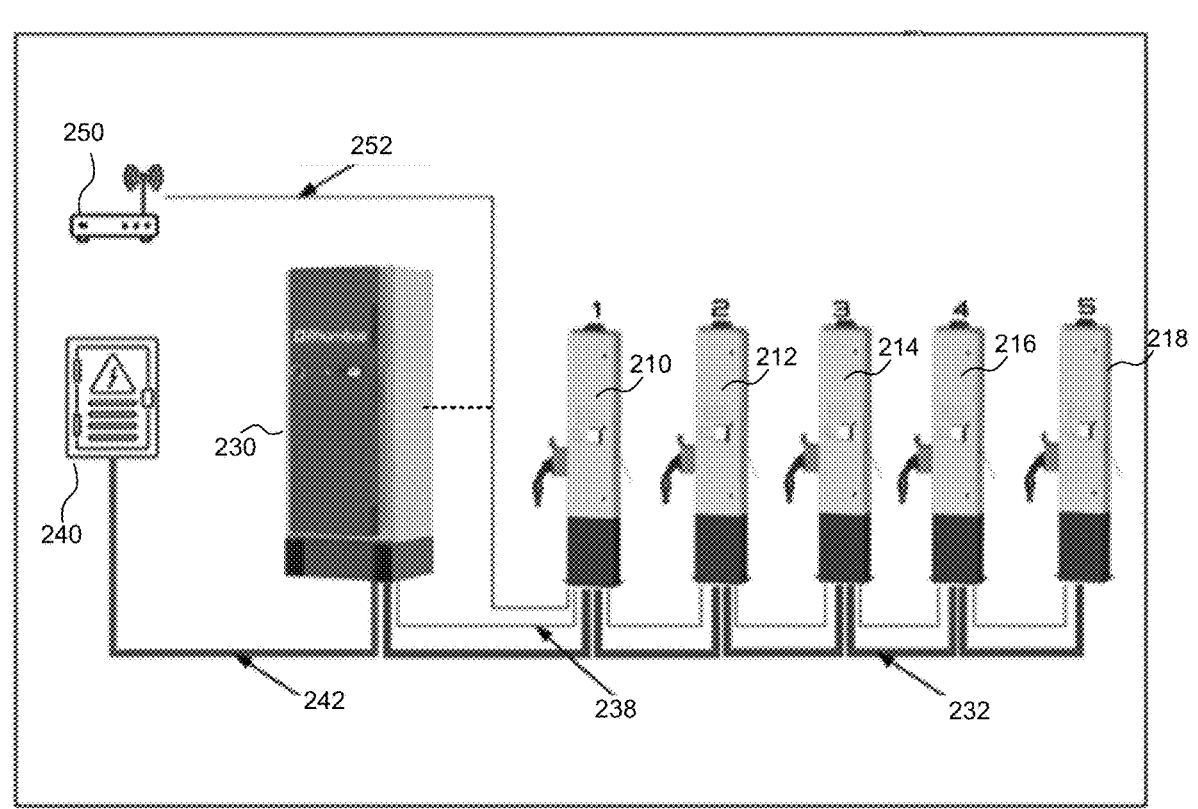
FIG. 2 illustrates a low level block diagram layout of an exemplary power system.

FIG. 2 illustrates a low level block diagram layout 200 of an exemplary power system, containing a plurality of exemplary dispensers 210, 212, 214, 216, 218, etc. connected in a series fashion. Power inverter/Power Control System (PCS) 230 converts AC power 242 from power panel 240 to DC power 232 and feeds it to the first dispenser 210, wherein the dispenser 210 in turn feeds the input DC power 232 into the next dispenser 212, which likewise feeds the input DC power 232 to the next dispenser 214, and so forth. A communication channel 238 is facilitated between the PCS 230 and each of the connected dispensers. Optionally, a communication channel 252 can be facilitated between an external server or controller 250 and one or more of the dispensers and the power inverter 230, to provide management of the power inverter 230 and dispensers 210, 212, 214, 216, 218 as well as provide usage, health, billing and other assorted capabilities. While the above communication channels 238 and 252 are shown as hard lines, it is well understood that a wireless channel may be used, according to design preference.

It is apparent that because the exemplary approach facilitates "only one dispenser charging at a time," it obviates the need for a separate power distribution cabinet 110, as seen in the prior art of FIG. 1. Moreover, additional exemplary dispensers can be added with little to no modification of the existing system. The ability to perform this is accomplished by having power relay pairs integrated into each exemplary dispenser 210, 212, 214, 216, 218, etc. (e.g., 4× power relays/dispenser) and feeding power from one dispenser serially to the next dispenser via the power relay connections. For example, if there is a set of 4 power relays in a dispenser (e.g., 210), one pair of the set of 4 power relays can be output to an EV charging cable of the dispenser 210 (to power a connected EV—not shown) and the other pair of the set of 4 power relays in the dispenser 210 can be connected in series to the next dispenser (for example, 212), and repeated so forth in each subsequent dispenser for the remaining dispensers (212->214->216, etc.). This configuration allows the easy addition of sequential dispensers, while bypassing the limitations of a power distribution cabinet.

As stated above, for safety purposes, only one pair of power relays within a given dispenser can be activated at a time and further, analog circuit protection can be used within the dispensers. Specifically, by utilizing auxiliary relay contacts connected to the power relays and preventing both pairs of power relays from closing at the same time, uncontrolled current flow from one vehicle to another vehicle can be prevented. This fault condition could result in possible damage to equipment or vehicle and other safety concerns. Avoiding this is accomplished by detecting the state of auxiliary relay(s) and acting accordingly.

Note: These auxiliary contacts may be looked at as small signal level relays that are physically connected to the main power relay and physically move/switch along with the main power relay. This feature is typically used to monitor relay state (e.g., open or closed) at a low voltage/signal level. It can also be used to detect whether a given relay is stuck open or closed.

In an exemplary configuration, the power relays are configured as "normally open" (No current flow when the coil is not energized). The auxiliary (relay) contacts on these power relays offer both "normally open" and "normally closed" signal connections. The auxiliary contacts on one pair of power relays can be used to either allow or prevent closing the other pair of power relays. This analog approach is a safety design that does not depend on software controls alone to prevent both sets of power relays closing at the same time. Therefore, this approach provides near fool-proof safety interlocking of the relays' contactors.

It is also understood that in some embodiments, an AC-DC power inverter may not be necessary as a front end to the exemplary system, so as to only require a PCS. This would arise if the originating power source is a DC power source. Or, the power inverter is integrated into the PCS.

Figures 3, 4:
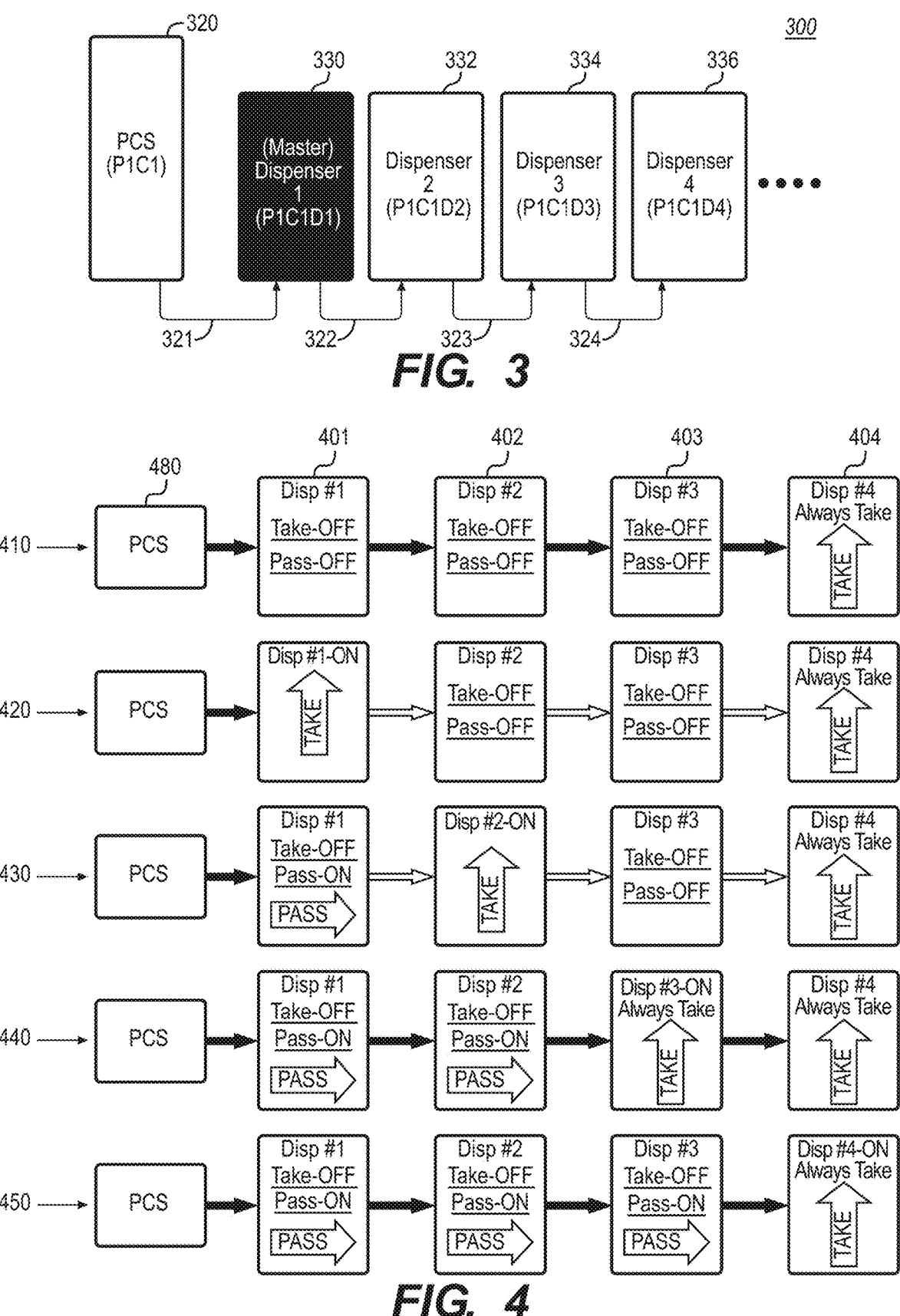
FIG. 3 is an example configuration of an exemplary Power Inverter/Power Control Station (PCS) serially connected via a Master Dispenser and to subsequent Dispensers.
FIG. 4 is a state diagram illustration for the configuration of FIG. 3, showing the arrangement for a null state and a single operation state.

FIG. 3 is an example configuration 300 of an exemplary Power Inverter/Power Control Station (PCS) 320 serially connected (321, 322, 323, 325) via a Master Dispenser 330 (Disp #1) to respective Dispensers 332 (Disp #2), 334 (Disp #3), and 336 (Disp #4). And is provided to show a sample 4-Dispenser system, wherein the operational logic is elaborated in the following FIG. 4.

FIG. 4 is a state diagram illustration 400 for the configuration of FIG. 3, showing the arrangement for a null state (no charging) and a single operation state (a single dispenser charging). Since there are four dispensers (401, 402, 403, 404), this diagram tries to illustrate the 5 possible operational scenarios (indicated by rows 410, 420, 430, 440, 450) with different power relay states (Pass or Take) for each dispenser associated with a dispenser that is forwarding the charging power—Dispenser 1, 2, 3 or 4. One "master" dispenser (typically, but not necessarily Dispenser 1) coordinates the operating states between connected dispensers 401, 402, 403, 404 and is connected to PCS 480.

Here, it is understood that 4 power relays (set up in +/− pairs) are in each Dispenser (except, optionally, for the last series connected dispenser 404, discussed below). In "each" dispenser, one pair of power relays controls power to the EV charging connector and represents a "Take" power condition when "On" and a "non-power Take" condition when "Off." The other pair of power relays within the dispenser controls power to the next connected dispenser and represents a "Pass" power condition when "On" and a non-power Pass condition when "Off."

Since the last Dispenser 404 is not serially connected to a follow-along dispenser, it can be defaulted automatically to a Take condition and therefore, the "Pass" set of power relays are not used. If there is no desire to add a follow-along dispenser to the last Dispenser 404, then Dispenser 404 can be a conventional dispenser type, not having the 4-relay configuration described above, understanding that it will not be able to supply power to a later added dispenser.

410 represents a possible "Standby" default scenario where no EV is being charged. All but the last Dispenser 404 is in an "Off" Pass & Take state. No power is fed into any of the Dispensers.

420 represents a possible "Dispenser 1 charging" scenario where an EV is being charged by the first Dispenser 401. Here, first Dispenser 401's Take condition is "On" and the attendant power relays are engaged so power can be being fed into first Dispenser 401's EV charging cable/connector. Not shown, but evident is the Pass condition-set here as "Off", so that the attendant power relays for passing power to the next dispenser are not engaged, preventing power from being forwarded to the next connected dispenser(s). Therefore, the next connected dispensers 402, 403 can have their Take and Pass power relays in an Off state.

430 represents a possible "Dispenser 2 charging" scenario where an EV is being charged by the second Dispenser 402. Since no power is being "used" by the first Dispenser 401, its power relays for Take are not engaged (or set to off) and the power relays for Pass are engaged (or set to on), forwarding power to second Dispenser 402. Since the second Dispenser 402 is providing power to a connected EV, its Take condition is "On" and the attendant power relays are engaged to supply power to its charging cable/connector. The next-connected third Dispenser 403, not being active, has its Take and Pass relays in an Off state.

It should be apparent from the above that if a Dispenser is positioned later in a line of Dispensers, and if that later Dispenser is the Dispenser charging an EV, then the prior Dispensers' Take and Pass relays can be appropriately toggled to Pass power as needed.

Scenarios 440 and 450 represent the next sequence of conditions—third Dispenser 403 charging an EV and the fourth Dispenser 404 charging an EV, respectively. In view of the explanations provided for scenarios 420 and 430 above, and the descriptions in FIG. 4, it is understood that the attendant Take and Pass power relays are engaged/disengaged, therefore further elaboration is not needed for these additional single Dispenser operation scenarios.

FIG. 5A is an illustration of the exterior of an exemplary Dispenser 500, with FIG. 5B showing the principal modifications 550 to the relay board 555 in the exemplary Dispenser 500. Relay board 555 is shown here fitted with two pairs of power relays, where "W" and "X" are a relay pair and are the respective+/− (or −/+) Take power relays connected to the Dispenser's charging cable 510. The "Y" and "Z" are another relay pair and are the respective+/− (or −/+) Pass power relays available for connection to the next Dispenser. For simplicity, the positive side of the Take relay (e.g., W) is connected to or shared with positive side of the Pass relay (e.g., Y). Likewise, the negative side of the Take relay (e.g., X) is connected to or shared with negative side of the Pass relay (e.g., Z).

Since the Take and Pass relay pairs share a common positive connection and common negative connection, supply power to the Dispenser relay board 555 can be sent to either the Take relay or Pass relay connections. That is, the positive line from the PCS or prior Dispenser can be connected to either one of the positive Take or Pass relays via the appropriate terminal connections; and the negative line from the PCS or prior Dispenser can be connected to either one of the negative Take or Pass relays via the appropriate terminal connections. It should be expressly understood that the term negative (in the context of a DC circuit) is also considered the ground, and the terms may be used interchangeably.

FIG. 6 is a closeup view 600 of the exemplary relay board 555 of FIG. 5, showing a possible connection topology for the respective W, X, Y, Z relays discussed above. Relays W and Y share a common connection or bus 610 while relays X and Z share a common connection or bus 620. Terminals 615 and 625 are the power input terminals and are connected to the two shared common connection or buses 610 and 620, respectively, and externally provided power from a (PCS or prior dispenser) is connected thereto (+/− or =/+). Therefore, because of the shared buses, all of the relays, W, X, Y, Z will have access to external power.

Terminals 617 and 627 are the Pass terminals and are connected to relays Y and Z. A follow-on or subsequently connected dispenser is connected to these terminals 617, 627 (+/− or =/+). Relays W and X have connections (not shown) that supply+/− or =/+) power to the Dispenser's charging cable/connector.

It should be understood that the W-, X-to-Pass and Y-, Z-to-Take matching shown above are conventions for explanation and do not necessarily signify these "labeled" relays are hard fixed to their respective functions. For example, it is possible for the W, X relays (if appropriately placed) to be designated for the Take function while the Y, Z relays (if appropriately placed) are designated for the Pass function.

Therefore, the W, X, Y, Z assignments may vary depending on either the context, implementation preference or circuitry shown.

FIG. 7 is an illustration 700 of circuit diagrams of one set of commercially available power relays with and without auxiliary contacts. In this example, a Snap-action switch (S880 W1R6 a) from SCHALTBAU having an auxiliary contact was found to be suitable. It is expressly understood that the choice of relays used for effecting the embodiments described are not limited to those shown here. This FIG. simply illustrates that a suitable power relay with an auxiliary contact is readily available in the market. Therefore, many others from different manufacturers may be used, according to design and implementation preference.

FIG. 8 is an illustration of dimensional diagrams of one possible set of suitable relay(s) from SCHALTBAU (C310S/150, C310S/300, C310S/500).

FIG. 9 is photograph 900 of a representative SCHALTBAU (C310S/150, C310S/300, C310S/500) relay, showing the placements of a power input (output) terminal/contact 910 and the auxiliary input/output terminal/contact 920. It is noted the corresponding power output (input) terminal/contact is not shown, being obscured from view.

FIG. 10A is a logic table 1000 for operation of an exemplary dispenser, within the connection methodology shown in FIG. 10c. For example, Coil Enable and Select YZ signals trigger the respective W, X, Y, Z relays to their respective on/off states (1= on; 0=off). Of course, reverse logic may be implemented to achieve the same functional results.

FIG. 10B is a simple power routing diagram of the W, X, Y, Z relays for an exemplary dispenser 1, connected to another dispenser 2. This diagram is understood to be self explanatory.

FIG. 10C is high level schematic 1010 of one possible electrical connection methodology to achieve the operational logic (seen in FIGS. 10A-B) for an exemplary dispenser operation. Of significance is the safety measures obtained via the auxiliary contact implementation. For example, if power relays X &/or W are closed, the auxiliary contacts will not allow power needed to close relay(s) Y &/or Z to be sent to relay(s) Y &/or Z. Vice versa, if power relay(s) Y &/or Z are closed, power will not be available to close relay(s) W &/or X.

As an example, to achieve the W, X, Y, Z states (0,0,1,1) shown in row 3 of FIG. 10A, the Coil Enable signal is set at 1 (triggered) and the and Select YZ signal is set at 0 (not-triggered). Logic within module 1015 removes power to drive Transistors 1052 and 1054, turning off W, X relay pair 1020 while signals from 1056, 1058 trigger to operate Y, Z relay pair 1030. Therefore, for a stuck relay in the opposite path, the exemplary methodology will automatically kill power to the selected coils. No logic combination of Coil Enable Signal and Select YZ 1015 combination can apply power to both W, X relay pair 1020 and Y, Z relay pair 1030.

In some embodiments, the logic "controlling" circuitry may be wholly within the charger, or wholly/partially within the PCS. In other embodiments, it may be external to both.

FIG. 11 is a depiction 1100 of a proposed single channel with simultaneous charging (1:1) configuration, where each exemplary dispenser is each PCS connected for full power (e.g., 60 kW) charging operation. The two "solid" lines from the PCS to a dispenser represent the positive/negative power lines and the dashed line represents a communication channel. This example shows a less efficient "design" approach, as each dispenser requires a PCS, but is provided to demonstrate one possible charging configuration. One advantage of this approach is that sequential powering to the respective dispensers is not needed and each dispenser can simultaneously max charge its EV.

FIG. 12 is a depiction 1200 of a proposed single channel with simultaneous sequential charging (5:1) configuration, where each exemplary dispenser is sequentially connected and fed from a single PCS 1210 linked to the first Dispenser 1220. The two "solid" lines from the PCS to a given dispenser represent the positive/negative power lines and the dashed line represents a communication channel. For efficiency purposes, the order of charging starts with Dispensers closest to PCS 1210.

(a) Charging Order by Dispenser 1→2→3→4→5

(b) Because the system can be intelligently controlled, it can alternately perform management of sequential charging based on order of parking (charging) spots.

(c) In some embodiments, the PCS 1210 can be rated for a lower power (e.g., 60 kW) or higher power (e.g., 125 kW) and deliver power accordingly. Other "scheduling" schemes are further detailed below.

FIG. 13 is a depiction 1300 of a Case Study—Bus charging and is illustrative of how charging can be facilitated for multiple vehicles. This process can be implemented in software either in the PCS and/or in a server connected to the exemplary system.

Buses 1, 3 and 5 plugged in:
a. Charging will start with Dispenser 1
b. Skip Dispenser 2 since there is no bus
c. Dispenser 3 will charge to scheduled State of Charge (SOC)
d. Skip dispenser 4 since there is no bus
e. Dispenser 5 will charge to SoC
f. 1→2(skip)→3→4(skip)→5

FIG. 14 is a depiction 1400 of Sequential Charging—Control Functions Customer control functions, where all the dispensers are operating to charge their respective vehicle. The maximum SOC can be set to each individual dispenser.

Example: Disp1=>90%; Disp 2=>80%; Disp 3=>70%; Disp 4=>65%; Disp 5=>100%. Of course, these values are for demonstration and other values may be used according to design preference.

Also, the driver can stop charging at dispenser by pushing a stop charge button on the dispenser or an administrator can remotely send a stop command from a cloud platform." Trying to indicate there are many ways to stop the charge session to move to the next dispenser. The above process can be implemented in software either in the PCS and/or in a server connected to the exemplary system.

FIG. 15 is flow chart showing one possible Sequential (Pass, Take, Shut) Switching Logic process 1500 for a Multi-Dispenser Configuration. Switching logic is required for proper dispenser operation and can be software-based. For an exemplary mode of operation, a Time-Based Round Robin (TBRR) approach was determined as the simplest option. However, other approaches may be used, for example, a queue, and so forth. As to the TBRR approach, one possible mode is where the dispenser that is physically closest to PCS is designated as Dispenser 1. Therefore, Dispenser 1 will be the one connecting to the AC meter. Since the system is "communication intelligent," Dispenser 1 can be designated with a given host name. And the rest of the connected dispensers designated with a host name that indicates Dispenser 1's hostname (e.g., Dispenser 1->"BBB"; Dispenser 2->BBB_disp2"). The last dispenser can house the communication modem, if so desired. Vehicles will be charged in dispenser order number. Each vehicle will get predetermined period of charging time and can disconnect and "Pass" (move to the next dispenser) when one of the following reasonable conditions occur (some of these conditions are adjustable and optional).

If $P_{out}$ is > or < a Set Point (e.g., power level)

SOC > or < a predetermined threshold

Time > or < a predetermined period

User presses the Stop Charge button on the dispenser

Charging fault in EV

Number of EVs charging

Etc.

Of course, the above conditions are not the only conditions useable and are offered to demonstrate one set of many possible conditions. Therefore, an operator or manager of a charging system may determine other parameters and values for determining a Pass, etc. condition. For example, the operator may decide that after 5 minutes of the PCS being off, the next dispenser will 'Take' and start charging, or a Set Point is 90% of max power, etc. This process can be implemented in software either in the PCS and/or in a server connected to the exemplary system.

Using a TBRR approach, the exemplary process 1500 shown in FIG. 15 starts 1505 by testing 1510 to see if a charger's Power is practically zero or has been "off" for a predetermined period of time (shown here, for example, as 5 min.). If not, the process 1500 cycles back to reperform this test 1510, until an "on" condition is encountered. It yes, the process 1500 proceeds to start a timer 1515. Next, a determination is made as to whether a vehicle is connected to the charger 1520. If yes, the process 1500 checks 1530 to see if Power is not flowing? If no power is being used, then it is determined the unit is not charging and a Take condition 1535 is triggered (this ensures that a Take is only occurring when no one else, no other charger is charging). From there, the process 1500 returns to step 1515.

If 1530's test determines power is flowing, the process 1500 concludes that charging is occurring and performs a series of "charging condition" tests (1550) for switching to another charger in the system (e.g., when to round robin). The first test 1555 is see if the Power is below a predetermined Set Point threshold (shown here, for example, below 10 kW). If insufficient power is being used (Y), the process 1500 shuttles to a Shut condition 1580, understanding that very little charging is occurring, and turns the charging off to allow a Pass condition 1580 to the next (not shown) charger/vehicle. Upon a Pass condition 1580, the process restarts at step 1510.

If test 1555 determines sufficient power is flowing, test 1560 checks to see if SOC above a predetermined threshold (shown here, for example, above 85%). If Yes, then the process 1500 proceeds to the Shut condition 1580 to allow Pass condition 1580 to the next (not shown) charger/vehicle.

If test 1560 is No, then a time of charging test 1565 is performed, the example here being 1 hr. If charging has been for more than an hour, the process 1500 goes to the Shut 1580 and Pass 1590 conditions. If not, the next test 1570 is performed, to see if the user has stopped the charging. If yes, then process 1500 goes to the Shut 1580 and Pass 1590 conditions. If not, then the process 1500 returns to step 1515 and the restarts from there.

It should be understood that while the above process steps, algorithms or the like may be described in a sequential order, such processes may be configured to work in different orders. In other words, any sequence or order of steps that may be explicitly described does not necessarily indicate a requirement that the steps be performed in that order. For example, the unit charging steps 1550 may be in different order, or less or additional steps may be implemented. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A multi-charger, serially operated electrical vehicle (EV) charging system, comprising: a Power Control System (PCS) providing DC power to an output line; a plurality of EV chargers serially power-connected to each other; and a first EV charger of the plurality of EV chargers connected to the DC output line, sets of relays in at least the first EV charger, connected to the DC output line, wherein a first set of the set of relays, when activated, is configured to supply power to a respective charging cable of the EV charger, and a second set of the set of relays, when activated, is configured to supply power to a next-serially connected EV charger, wherein the sets of relays contain auxiliary contacts providing relay status information; and a controller, preventing the first and second sets of relays from simultaneously being activated, allowing only one EV charger of the plurality of EV chargers to charge at a time.

2. The system of claim 1, further comprising an AC Power Inverter providing DC power to the PCS.

3. The system of claim 2, wherein the AC Power Inverter and PCS are an integrated, single system.

4. The system of claim 1, wherein a last of the serially connected plurality of EV chargers does not contain multiple sets of relays.

5. The system of claim 1, wherein an activated first set of relays is a Take condition, enabling a charging operation.

6. The system of claim 1, wherein an activated second set of relays is a Pass condition, enabling a pass of power operation.

7. The system of claim 1, further comprising an EV charger communication channel, between EV chargers.

8. The system of claim 7, wherein the communication channel communicates to at least one of the PCS and to an external server.

9. The system of claim 7, wherein the communication channel is wireless.

10. The system of claim 1, wherein the controller is hardware circuitry within the EV chargers.

11. The system of claim 1, further comprising a switching logic controlling the EV chargers' sets of relays.

12. The system of claim 11, wherein the switching logic is software-based and hosted on an external server communicating with the PCS.

13. The system of claim 12, wherein the switching logic utilizes a Time-Based Round Robin (TBRR) approach.

14. The system of claim 13, wherein the switching logic further utilizes at least one of Set Point threshold, State of Charge threshold, Charged Time, User action, EV Fault, and number of EVs charging to determine an operation duration for an EV charger of the plurality of EV chargers.

15. The system of claim 1, wherein the first and second sets of relays are first and second pairs of relays, and one side of the pairs of relays is connected to a DC positive and another side of the pairs of relays is connected to a DC negative or ground.

16. A method of charging a plurality of EVs in a multi-EV charging station, comprising: connecting a first EV charger of a plurality of EV chargers to a DC output line of a Power Control System (PCS); connecting a DC power line of each next EV charger of the plurality of EV chargers to each other to form a serial power connection between EV chargers, including the first EV charger; establishing a communication channel between each EV charger of the plurality of EV chargers and also to the PCS; and operating only one EV charger at a time, wherein each EV charger has at least one of a hardware logic and relay circuitry that physically prevents more than one EV charger activation at a time.

17. The method of claim 16, wherein the operating is controlled via sets of relays having auxiliary contacts in the EV chargers, the auxiliary contacts providing a relay state status to at least one of the hardware logic and a controller, via the communication channel.

18. The method of claim 16, wherein the operating utilizes a Time-Based Round Robin (TBRR) approach.

19. The method of claim 18, wherein the TBRR approach further utilizes at least one of Set Point threshold, State of Charge threshold, Charged Time, User action, EV Fault, and number of EVs charging to determine an EV charger operation duration.

20. The method of claim 19, wherein the TBRR approach is software based and controlled by an external server in communication to the PCS.

* * * * *